United States Patent Office 3,211,651
Patented Oct. 12, 1965

3,211,651
LUBRICATING COMPOSITIONS CONTAINING
POLYETHER DERIVATIVES
John Scotchford Elliott and Eric Descamp Edwards,
London, England, assignors to Castrol Limited,
London, England, a British company
No Drawing. Filed Dec. 11, 1961, Ser. No. 158,545
Claims priority, application Great Britain, Dec. 19, 1960,
43,605/60
4 Claims. (Cl. 252—46.7)

The invention relates to organic compounds and in particular to new organic compounds, methods of preparing these organic compounds and lubricating compositions containing the novel compounds.

According to one aspect of the invention there is provided a derivative of a polyether having the general formula:

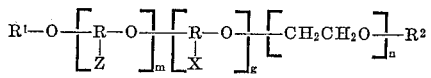

where R is a branched chain alkylene radical having 3 or 4 carbon atoms, $R^1$ and $R^2$ are H, alkyl, cycloalkyl, aryl, aralkyl or alkaryl groups, Z is the residue of a sulphur-containing acid and is attached to R by a sulphur atom, X is chlorine or bromine, $g$ is zero or an integer, $m$ is an integer of at least two and is at least one-half of $g$, and $n$ is zero or an integer.

According to another aspect of the invention there is provided a derivative of a polyether having the general formula:

where R is a branched chain alkylene radical having 3 or 4 carbon atoms, $R^1$ and $R^2$ are H, alkyl, cycloalkyl, aryl, aralkyl or alkaryl groups, X is chlorine or bromine, $g$ is zero or an integer, $m$ is an integer of at least two and is at least one-half of $g$, $n$ is zero or an integer, and $p$ is an integer of from 1 to 4.

It will be understood that it is not normally possible to control the order in which the various repeating groups in these compounds are linked together, and that the repeating groups may in fact be arranged in any order. Also, where R, $R^1$, $R^2$, $g$, $m$ or $n$ occur more than once in the same general formula, there is no need for the groups or numbers represented to be the same in each case.

The groups Z may be for example:

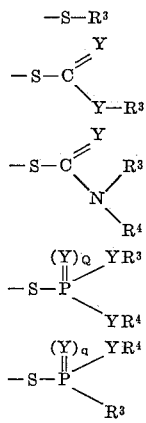

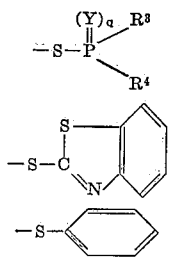

where $R^3$ and $R^4$ are hydrocarbon radicals which may be the same or different and may carry substituents such as halogen, Y is oxygen or sulphur, and $q$ is zero or one. Preferred radicals Z are xanthyl, dithiocarbamyl, dithiophosphate and benzthiazolylthio.

The value of $a$ (where $a=m+g$) will normally be from 2 to 70, and $n$ is preferably zero or not greater than $(a)$; $R^1$ and $R^2$ are preferably hydrogen or simple alkyl radicals although they may contain for example up to 20 carbon atoms. Preferably $R^1$ and $R^2$ have the formula $C_nH_{2n+1}$ where $n$ is selected from the group consisting of 0 and an integer of not more than 5. The value of $m$ must be at least half of $g$ and is preferably not less than $g$.

In a preferred form of the above derivatives of polyethers, $R^1$ is an alkyl chain containing not more than 5 carbon atoms, $R^2$ is hydrogen, $a$ is between 7 and 40 and $n$ is zero.

The new compounds according to this invention may be prepared from the halogenated polyethers which are described and claimed in United States patent specification Serial No. 69,805.

The invention also includes methods of preparing the above derivatives of polyethers which methods comprise either:

(a) Reacting a halogenated polyether having the general formula:

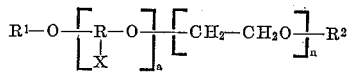

where R, $R^1$, $R^2$, X, $a$ and $n$ are defined above and $a=(m+g)$ with a salt of Z with a metal selected from group 1 of the periodic table; or (b) Reacting a halogenated polyether having the general formula:

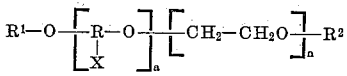

where R, $R^1$, $R^2$, X, $a$ and $n$ are as defined above with a sulphide or di- or poly-sulphide of a metal selected from group 1 of the periodic table.

Preferably the metal selected from group one of the periodic table is sodium and the chlorinated polyether has the formula:

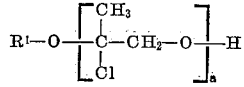

where $R^1$ is an alkyl chain containing not more than 5 carbon atoms, and $a$ is between 7 and 40.

Only those halogen atoms which are directly attached to a secondary carbon atom are likely to react in the method of this invention. During the halogenation of a polyether to produce a halogenated polyether as described in our co-pending application, chlorine or bromine atoms may be introduced into groups $R^1$ and $R^2$; these halogen groups are less reactive and unlikely to be replaced.

The new compounds in accordance with this invention may be employed as lubricating oil additives having extreme pressure properties. Particularly preferred compounds for this application are, for example, those compounds which contain xanthate, thiocarbamate, disulphide and thiophosphate groups. These particular new compounds have extreme pressure properties.

Accordingly the present invention also provides a lubricating composition comprising a major proportion of a mineral or synthetic lubricating oil and from 0.1 to 20%, preferably 0.5 to 5%, by weight on the weight of the composition, of the above described derivatives of polyethers.

Following is a description by way of example of methods, in accordance with the present invention, of preparing from a brominated or chlorinated polyether containing branched chain alkylene groups of 3–4 carbon atoms where the halogen is present from about 10 to 56 percent by weight and is bonded to the secondary carbon atom of said alkylene group the new compounds which contain from about 5% to about 16% sulphur and from about 1.6% to about 16% halogen.

EXAMPLE I

*Preparation of polypropylene glycol poly (diisopropyl dithiophosphate)*

Four grams of sodium hydroxide (0.1 mole) were dissolved in the minimum amount of water, in a 250 ml. beaker to which were added about thirty ml. of alcohol. This solution was added to a solution of 22.4 gm. (0.1 mole) of diisopropyl dithiophosphoric acid in thirty ml. of alcohol. A pale yellow solution was obtained and to this was added 19.2 gm. ($\equiv$ 0.1 mole chlorine) of a chlorinated polypropylene glycol (molecular weight about 470) dissolved in about thirty ml. of benzene. The chlorinated polypropylene glycol contained 18.5% chlorine. The solution was transferred to a 250 ml. flask fitted with a reflux condenser and refluxed for five hours. At the end of this time 4.5 gm. of sodium chloride were filtered off. The solvent was distilled off leaving the product which was a dark brown liquid having the following analysis:

Percent S=14.75
Percent P=6.63
Percent Cl=1.6

EXAMPLE II

*Preparation of a chlorine-bearing sulphide from chlorinated Ucon LB–1145*

Using the same apparatus as described in Example I, 10 grams of chlorinated Ucon LB–1145, containing 22.0% Cl ($\equiv$ 0.0614 mole chlorine) were dissolved in about twenty ml. of isopropyl alcohol; to this was added a solution of 7.5 gm. sodium sulphide (0.0307 mole) in 30 ml. of alcohol. The resulting brown solution was refluxed for five hours. 3.1 grams of sodium chloride were obtained. The alcohol was then distilled off leaving the product as a dark brown viscous liquid having the following analysis:

Percent S=5.18
Percent Cl=8.64

EXAMPLE III

*Preparation of polypropylene glycol ether poly(di-n-butyl dithiocarbamate) from Ucon LB–1145*

Using the same apparatus as described in Example I, 10 grams of chlorinated Ucon LB–1145 containing 27.2% Cl ($\equiv$ 0.076 mole chlorine) were dissolved in about thirty ml. of isopropyl alcohol and slowly added to a solution of 15 grams of sodium dibutyl dithiocarbamate (0.066 mole) in thirty ml. of alcohol. The resulting dark brown solution was refluxed for four hours; 3.4 grams of sodium chloride were filtered off. The solvent was distilled off leaving a brown viscous liquid having the following analysis:

Percent S=14.8
Percent Cl=5.65
Percent Na=0.3

EXAMPLE IV

*Preparation of a chlorine-containing polyethylene/polypropylene glycol ether poly di(1:3 dimethyl butyl) dithiophosphate*

33 grams chlorinated Ucon 50–HB–3520 (containing 10.5% chlorine) were dissolved in Industrial Methylated Spirits (I.M.S.) and placed in a tap funnel fitted to a 250 ml. 3-necked round-bottomed flask equipped also with a stirrer and reflux condenser. In the flask was placed an I.M.S. solution of sodium di(1:3 dimethyl butyl)dithiophosphate prepared by neutralising 26 grams of di(1:3-dimethyl butyl) dithiophosphoric acid with sodium hydroxide in I.M.S. solution. The chlorinated Ucon was then run slowly into the stirred dithiophosphate solution. When the addition was complete, the resultant cloudy solution was heated and then refluxed for 3 hours, allowed to cool and filtered from sodium chloride. The solvent was then stripped out under reduced pressure to give a crude product containing 1.88% sodium. In order to purify it the product was dissolved in benzene and washed three times with equal values of distilled water, the benzene phase separated, dried over anhydrous magnesium sulphate and the solvent distilled out (finally under reduced pressure) to give 22 grams of a red-brown viscous liquid, containing 4.25% chlorine, 7.45% sulphur, 4.45% phosphorus and 0.026% sodium.

EXAMPLE V

*Preparation of a chlorine containing polysulphide from chlorinated poly (1:3 butylene) glycol*

32.3 grams chlorinated polyglycol B. 1000 (containing 21.8% chlorine) were dissolved in about 100 mls. of n-butanol and placed in a 250 ml. two-necked round-bottomed flask fitted with a reflux condenser and a tap funnel. 7.86 grams (0.1 gm. mol.) of anhydrous sodium sulphide and 6.4 gms. (0.2 gm. atom) of sulphur were dissolved in about 100 ml. of boiling butanol and the solution placed in the tap-funnel. The flask was heated by means of an electric heating mantle and the solution brought to reflux. The contents of the tap-funnel were added slowly to this refluxing solution, and thereafter maintained at reflux for a further 5 hours. When cool, the solid (sodium chloride) was filtered off and the filtrate distilled to remove the butanol. The dark brown residue was dissolved in benzene and washed four times with distilled water. The first wash water was very dark in colour, but each wash was progressively lighter, the last being an amber colour. The benzene solution was then dried over anhydrous magnesium sulphate, boiled (twice) with animal charcoal, filtered and the benzene distilled off to leave a very dark brown liquid containing 3.94% chlorine, 8.73% sulphur and 0.55% sodium.

EXAMPLE VI

*Preparation of a poly(isopropyl xanthyl) derivative of chlorinated Ucon LB–1145*

12.9 grams of di-n-butylamine were dissolved in methanol and neutralised with concentrated hydrochloric acid to give a yellow solution. This solution was added slowly to a stirred slurry of 15.8 grams sodium isopropyl xanthate in benzene. The mixture so produced was then refluxed in a round-bottomed flask equipped with a Dean and Stark trap surmounted by a water-cooled reflux condenser. As the water/methanol/benzene azeotrope distilled out, benzene was added until all methanol had been removed (by running off the azeotrope from the Dean and Stark trap). This gave a dark red solution which became amber coloured when all the water present had distilled out. To the dry refluxing benzene solution a solution of 13.1 grams chlorinated Ucon LB–1145 (containing 27.1% chlorine) was added, and refluxing maintained for a further 3 hours after this addition. The resulting mixture was cooled, filtered and the benzene removed to give a brown viscous liquid. This was decolourised by refluxing with 5% fuller's earth in alcohol, filtered and the alcohol distilled out to give a viscous light brown liquid. The product contained 5.42% sulphur and 10.9% chlorine.

The following Table I shows the results of four-ball machine tests carried out so as to compare the extreme pressure properties of lubricating oils with and without the additives of the invention. Tests 1 and 5 are comparative tests. The performance of the composition used in tests 2, 3, 4 and 6 is notably and surprisingly superior to the performance of the oils used in tests 1 and 5.

washed three times with an equal volume of distilled water. The benzene phase was dried over anhydrous magnesium sulphate and the solvent distilled out, finally under reduced pressure, to give 13.5 gm. of a red brown liquid containing 16.26% bromine, 12.57% sulphur, 7.4% phosphorous and 0.13% sodium.

EXAMPLE VIII

*Preparation of a chlorine-containing poly (benzthiazolylthio) Ucon DLB–144E*

10 grams of chlorinated Ucon DLB–144E (containing 20.1% chlorine) were dissolved in acetone and placed in a tap funnel fitted to a 250 ml. 3 necked round bottomed flask. In the flask was placed 200 mls. of a acetone solution of 10.6 grams of the sodium salt of 2-mercapto benzothiazole. The chlorinated Ucon was then run slowly into the stirred sodium mercapto benzothiazole solution. When the addition was complete the resultant dark brown

*Table I*
FOUR-BALL MACHINE TESTS

[Mineral Oil A consisted of a blend of 60% of a solvent refined mineral oil of viscosity about 140 seconds Redwood I at 140° F. with 40% of a solvent refined brightstock of viscosity about 600 seconds Redwood I at 140° F.]

| Test No. | Lubricating oil base | Additive | Load (kg.) at incipient seizure | Weld pt. (kg.) | Approx. load (kg.) at which wear scar diameter (mm.) | | |
|---|---|---|---|---|---|---|---|
| | | | | | 1.5 | 2.0 | 2.5 |
| 1 | Mineral Oil A (102) | None | 65/70 | 140/150 | 69 | 70 | 90 |
| 2 | Mineral Oil A | Product of Example VI (1%) | 75/80 | 220 | 97 | 158 | 208 |
| 3 | do | Product of Example I (1%) | 140/145 | 310 | 142 | 183 | 250 |
| 4 | do | Product of Example IV (1%) | 100/105 | 240 | 103 | 105 | 192 |
| 5 | Ucon 50-HB-100 | None | 80/85 | 140 | 84 | 85 | 113 |
| 6 | do | Product of Example V (1%) | 85/90 | 160 | 140 | 160 | |

The extreme pressure additives of this invention may be used in conjunction with conventional additives, and in particular with metal deactivators and halogen scavengers.

EXAMPLE VII

*Preparation of a bromine-containing poly (1:3 dimethyl butyl)dithiophosphate from Ucon LB–285*

10 grams of brominated Ucon LB–285 (containing 56.1% bromine) were dissolved in 20 ml. Industrial Methylated Spirits (I.M.S.) and placed in a tap funnel fitted to a 250 ml. 3 necked round bottomed flask equipped also with a reflux condenser. In the flask was placed 50 ml. of an I.M.S. solution of sodium di(1:3 dimethyl butyl) dithiophosphate prepared by neutralizing 17 grams of di(1:3 dimethyl butyl) dithiophosphoric acid with sodium hydroxide in 10 ml. aqueous I.M.S. solution. The brominated Ucon was then run slowly into the stirred dithiophosphate solution. When the addition was complete the resultant dark brown solution was heated and refluxed for three hours. The solvent was then stripped out under reduced pressure and the crude product was dissolved in 100 ml. benzene, filtered free from sodium bromide and solution was refluxed for three hours, allowed to cool and filtered free from sodium chloride. The solvent was stripped out, finally under reduced pressure, to give 18.5 grams of a dark brown viscous liquid containing 9.10% chlorine, 16.36% sulphur and 0.6% sodium.

The solubilities of the various products of the examples described above are set forth in Table II. The table of solubilities is to be interpreted using the following equivalencies:

Insoluble
Very low solubility—Soluble at less than 0.1%
Sparingly soluble—Soluble between 0.1 and 1%
Moderately soluble—Soluble between 1 and 5%
Freely soluble—Soluble up to at least 10%

*Table II*
SOLUBILITIES OF PRODUCTS IN VARIOUS BASE STOCKS

| Derivative | Di(2-ethyl hexyl) sebacate | Ucon LB–1145 | Mineral Oil A |
|---|---|---|---|
| Product of Example I | Freely soluble | Freely soluble | Sparingly soluble. |
| Product of Example II | Very low solubility | Very low solubility | Insoluble. |
| Product of Example III | Freely soluble | Freely soluble | Sparingly soluble. |
| Product of Example IV | Moderately soluble | Freely soluble (except for trace impurity) | Moderately soluble. |
| Product of Example V | do | Freely soluble | Insoluble. |
| Product of Example VI | Sparingly soluble | Sparingly soluble | Sparingly soluble. |
| Product of Example VII | Freely soluble | Freely soluble | Freely soluble. |
| Product of Example VIII | Insoluble | Sparingly soluble | Insoluble. |

The following are examples of lubricating compositions according to the present invention, percentages being by weight.

EXAMPLE IX

| | Percent |
|---|---|
| Mineral Oil A | 98.9 |
| Product of Example VI | 1.0 |
| Benzotriazole | 0.1 |

EXAMPLE X

| | Percent |
|---|---|
| Mineral Oil A | 98.5 |
| Product of Example VI | 1.0 |
| 9,10-epoxy stearic acid | 0.5 |

EXAMPLE XI

| | Percent |
|---|---|
| Ucon 50–HB–100 | 98.9 |
| Product of Example V | 1.0 |
| Mercaptobenzothiazole | 0.1 |

We claim:

1. A lubricating composition consisting essentially of a major proportion of an oil selected from the group consisting of a mineral and a synthetic lubricating oil having dissolved therein from 0.1 to 20% by weight of the reaction produce of (1) a halogenated derivative of a polyether containing branched chain alkylene groups of 3–4 carbon atoms where the halogen is present from about 10 to 56 percent by weight and is bonded to the secondary carbon atom of said alkylene groups and is selected from the group consisting of chlorine and bromine and (2) a Group I metal salt of an anion selected from the group consisting of sulphides containing up to four sulphur atoms, xanthyl, dithiocarbamyl, dithiophosphate and benzthiazolylthio whereby a major portion of said halogen atoms are replaced by said anion, said anion being bonded to the secondary carbon atom of said alkylene groups by the sulphur atom thereof and said reaction product containing at least 5% by weight of sulphur.

2. A lubricating composition as claimed in claim 1 wherein the weight of the polyether derivative on the weight of the composition is from 0.5 to 5%.

3. A composition according to claim 1 in which the reaction product contains not more than about 16% halogen.

4. A composition according to claim 3 in which the reaction product contains from about 5 to about 16% sulphur and from about 1.6% to about 16% halogen.

References Cited by the Examiner

UNITED STATES PATENTS

| | | | |
|---|---|---|---|
| 2,520,748 | 8/50 | Vaughan et al. | 252—48.2 |
| 2,619,508 | 11/52 | Mikeska et al. | 252—48.2 |
| 2,620,304 | 12/52 | Stewart et al. | 252—48.2 |
| 2,728,748 | 12/55 | Davis | 260—79.1 |
| 2,734,869 | 2/56 | Mullen et al. | 252—47.5 |
| 2,905,721 | 9/59 | Benneville et al. | 260—609 |

DANIEL E. WYMAN, *Primary Examiner.*

JULIUS GREENWALD, *Examiner.*